(12) United States Patent
Chiba et al.

(10) Patent No.: US 8,857,870 B2
(45) Date of Patent: Oct. 14, 2014

(54) BUMPER STRUCTURE

(75) Inventors: Kenji Chiba, Tokai (JP); Hitoshi Suehiro, Nisshin (JP); Takahiro Ishijima, Miyoshi (JP); Daisuke Nakashima, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/643,488

(22) PCT Filed: Apr. 20, 2011

(86) PCT No.: PCT/IB2011/000859
§ 371 (c)(1),
(2), (4) Date: Oct. 25, 2012

(87) PCT Pub. No.: WO2011/135422
PCT Pub. Date: Nov. 3, 2011

(65) Prior Publication Data
US 2013/0043692 A1    Feb. 21, 2013

(30) Foreign Application Priority Data

Apr. 26, 2010 (JP) ................. 2010-101005

(51) Int. Cl.
*B60R 19/30* (2006.01)
(52) U.S. Cl.
USPC ............... 293/133; 293/120; 188/377
(58) Field of Classification Search
CPC ........ B60R 19/18; B60R 19/22; B60R 19/30; B60R 19/34
USPC .......... 293/120, 109, 117, 136, 133; 296/187.09, 187.03; 188/377
See application file for complete search history.

(56) References Cited

U.S. PATENT DOCUMENTS 4,457,547 A * 7/1984 Sekiyama et al. ............ 293/110
(Continued)

FOREIGN PATENT DOCUMENTS

DE    2853244 A1    6/1980
EP    1564079 A1    8/2005
(Continued)

*Primary Examiner* — Jason S Morrow
*Assistant Examiner* — E Turner Hicks
(74) *Attorney, Agent, or Firm* — Gifford, Krass, Sprinkle, Anderson & Citkowski, P.C.

(57) ABSTRACT

A recess is formed at the center of a bumper absorber, provided on the vehicle outer side of a bumper reinforcement, so as to face forward, and an upper recess wall face of an upper absorber portion located on the upper side of the recess is inclined downward. If the subject vehicle is small in height and the amount of vertical overlap between the bumper absorber and the rear bumper of other vehicle (a barrier used in the narrow vertical overlap barrier test of the IIHS) is small, in the initial collision stage, the rear bumper of the other vehicle is guided by the inclined upper recess wall face to move relatively downward while the bumper of the subject vehicle moves relatively upward, preventing underride, increasing the amount of vertical overlap between the rear bumper of the other vehicle and the bumper absorber, and thus achieving reliable impact absorption.

6 Claims, 7 Drawing Sheets

(56) References Cited

U.S. PATENT DOCUMENTS

| | | | |
|---|---|---|---|
| 4,762,352 A * | 8/1988 | Enomoto | 293/120 |
| 5,154,462 A * | 10/1992 | Carpenter | 293/120 |
| 5,688,006 A * | 11/1997 | Bladow et al. | 293/120 |
| 7,025,396 B2 * | 4/2006 | Omura et al. | 293/102 |
| 7,575,259 B2 * | 8/2009 | Hasegawa | 293/120 |
| 7,686,358 B2 * | 3/2010 | Takahashi et al. | 293/102 |
| 8,061,743 B2 * | 11/2011 | Wakabayashi et al. | 293/102 |
| 2002/0149214 A1 | 10/2002 | Evans | |
| 2007/0114803 A1 * | 5/2007 | Takahashi et al. | 293/102 |

FOREIGN PATENT DOCUMENTS

| | | |
|---|---|---|
| EP | 2050625 A1 | 4/2009 |
| JP | 03-200452 A | 9/1991 |
| JP | 06-015316 B2 | 2/1994 |
| JP | 2001-030859 A | 2/2001 |
| JP | 2004-322876 A | 11/2004 |
| JP | 2007-196827 A | 8/2007 |
| JP | 2007-261525 A | 10/2007 |
| JP | 2007-290499 A | 11/2007 |

* cited by examiner

BUMPER STRUCTURE

BACKGROUND OF THE INVENTION

1. Field of the Invention

The invention relates to a vehicle bumper structure, and in particular to a bumper structure having a bumper absorber that absorbs an impact upon collision with an object.

2. Description of the Related Art

A bumper absorber (impact absorption member) for absorbing an impact upon collision is provided on the vehicle-longitudinal-direction outer side of each of the bumper reinforcements of the front and rear bumpers of a vehicle. The crash safety tests conducted by the Insurance Institute for Highway Safety (IIHS) in the United States include a narrow vertical overlap barrier test. In this test, an arc-shaped barrier is used, the center portion of which is convexed toward the outer side along the vehicle longitudinal direction. The barrier is vertically offset to partially overlap the bumper of the vehicle, and the front and rear sides of the vehicle are made to collide with the barrier at 10 km/h.

In the case of a vehicle that is relatively small in height, the vertical level of each bumper is low as compared to the vertical level of the barrier, and therefore the vertical overlap amount is not sufficient. In this case, because the vertical overlap amount is not sufficient, the vehicle may get into the lower side of the barrier, that is, so-called underride may occur, which can reduce the impact absorption capacity of the vehicle. On the other hand, in the case of a vehicle that is relatively large in height, the vertical level of each bumper is high as compared to the vertical level of the barrier, and therefore the vertical overlap amount is not sufficient. When the vertical overlap amount is not sufficient, the vehicle may run onto the barrier, that is, so-called override may occur, which can reduce the impact absorption capacity of the vehicle. For example, Japanese Patent Application Publications No. 2007-261525 and No. 2007-196827 (JP-A-2007-261525 and JP-A-2007-196827) each describe a bumper structure for preventing underride and override of a vehicle.

However, the technology described in JP-A-2007-261525 is not effective unless the bumper structures of the vehicles that collide with each other are identical. Further, the technology described in JP-A-2007-196827 requires the use of separate members for the bumper reinforcement (bumper beam) in order to increase the vertical overlap amount, and thus it has drawbacks of an increased number of parts, increased assembly time, and increased cost.

SUMMARY OF THE INVENTION

The invention provides a bumper structure that increases the vertical overlap amount but is simple in structure.

A bumper structure according to an aspect of the invention includes a bumper reinforcement and a bumper absorber that is provided on a vehicle-longitudinal-direction outer side of the bumper reinforcement, the bumper absorber having: a first absorber portion that is provided on one vertical side of a recess that is formed at a vertically intermediate portion of the bumper absorber and faces a vehicle-longitudinal-direction outer side; and a second absorber portion that is provided on the other vertical side of the recess, wherein a recess wall face of the first absorber portion that faces the second absorber portion is inclined such that a portion of the recess wall face on the side closer to a bottom of the recess is closer to the second absorber portion than a portion of the recess wall face on the side closer to an opening of the recess is, and the second absorber portion protrudes, in a region on a vehicle-longitudinal-direction outer side of a vehicle-longitudinal-direction outer side face of the bumper reinforcement, toward a side opposite to the first absorber portion side beyond a vehicle up-down direction end of the bumper reinforcement on the second absorber portion side.

Next, operations of the above-described bumper structure of the aspect of the invention will be described. For example, upon full vertical overlap frontal collision of a vehicle with an object (will hereinafter be referred to as "collision object" where necessary or appropriate), the collision object hits the vehicle portion corresponding to both the first and second absorber portions, and thus the collision load is efficiently absorbed by both of the first and second absorber portions.

On the other hand, in a case where the collision object with which a vehicle incorporating the bumper structure of the aspect of the invention (will hereinafter be referred to as "subject vehicle" where necessary or appropriate) collides is other vehicle that is different in height from the subject vehicle and therefore the bumper of the other vehicle faces the position that is offset to the first absorber portion side from the center between the first and second absorber portions of the bumper absorber, in the initial stage of the collision, the bumper of the other vehicle (corresponding to the barrier used in the narrow vertical overlap barrier test of the IIHS) is guided by the inclined face (recess wall face) of the first absorber portion to move, relative to the bumper absorber, toward the second absorber portion side, resulting in an increase in the amount of vertical overlap between the bumper of the other vehicle and the bumper absorber of the bumper structure of the subject vehicle.

Then, during the period from the middle stage to the later stage of the collision, the bumper of the other vehicle is guided by the inclined face of the first absorber portion to move further toward the second absorber portion side, and then it hits the second absorber portion and is finally received by the second absorber portion. In this way, the bumper absorber of the vehicle incorporating the bumper structure of the aspect of the invention can reliably prevent the bumper absorber of the vehicle from passing by the bumper of the other vehicle.

Thus, the bumper structure of the aspect of the invention increases the vertical overlap amount but is simple in structure.

The above-described bumper structure of the aspect of the invention may be such that the first absorber portion is arranged on an upper side of the second absorber portion. This bumper structure in which the first absorber portion is arranged on the upper side of the second absorber portion is applied to, for example, a vehicle, such as a sports car, that is relatively small in height as compared to the collision object and thus provides only a small amount of vertical overlap between the bumper absorber of the subject vehicle and the bumper of the other vehicle (corresponding to the barrier used in the narrow vertical overlap barrier test of the IIHS) that collides with the subject vehicle.

Operations when a small-height vehicle (subject vehicle) having a front bumper incorporating the bumper structure in which the first absorber portion is arranged on the upper side of the second absorber portion as described above collides, from behind, with the other vehicle in front will be described. In the initial stage of the collision, the rear bumper of the other vehicle (corresponding to the barrier used in the narrow vertical overlap barrier test of the IIHS) is guided by the inclined face (recess wall face) of the first absorber portion to move relatively downward while the bumper of the subject vehicle moves relatively upward, whereby the subject vehicle is prevented from getting into the lower side of the other vehicle, that is, so-called underride of the subject vehicle is prevented, resulting in an increase in the amount of vertical overlap between the rear bumper of the other vehicle and the bumper absorber with the bumper structure of the subject vehicle.

Then, during the period from the middle stage to the later stage of the collision, the rear bumper of the other vehicle is guided by the inclined face of the first absorber portion to move further downward, and then it hits the second absorber portion, which is located on the lower side of the first absorber portion, and is finally received by the second absorber portion.

Next, operations when another vehicle in the rear collides, from behind, with a small-height vehicle (subject vehicle) having a rear bumper incorporating the bumper structure in which the first absorber portion is arranged on the upper side of the second absorber portion will be described. In the initial stage of the collision, the front bumper of the other vehicle, which is colliding with the subject vehicle from behind, is guided by the inclined face (recess wall face) of the first absorber portion to move relatively downward while the bumper of the subject vehicle moves relatively upward, resulting in an increase in the amount of vertical overlap between the front bumper of the other vehicle and the bumper absorber with the bumper structure of, the subject vehicle.

Then, during the period from the middle stage to the later stage of the collision, the front bumper of the other vehicle is guided by the inclined face of the first absorber portion to move further downward, and then it hits the second absorber portion, which is located on the lower side of the first absorber portion, and is finally received by the second absorber portion.

As such, arranging the first absorber portion on the upper side of the second absorber portion effectively prevents underride of a vehicle that is relatively small in height as compared to the collision object.

The above-described bumper structure of the aspect of the invention may be such that the first absorber portion is arranged on a lower side of the second absorber portion.

This bumper structure in which the first absorber portion is arranged on the lower side of the second absorber portion is applied to, for example, a vehicle that is relatively large in height as compared to the collision object, such as recreational vehicles (RVs), and thus provides only a small amount of vertical overlap between the bumper absorber of the subject vehicle and the bumper of the other vehicle that collides with the subject vehicle.

In the following, operations when a large-height vehicle (subject vehicle) having a front bumper incorporating the bumper structure in which the first absorber portion is arranged on the lower side of the second absorber portion collides, from behind, with another vehicle in front will be described. In the initial stage of the collision; the rear bumper of the other vehicle is guided by the inclined face (recess wall face) of the first absorber portion to move relatively upward while the bumper of the subject vehicle moves relatively downward, whereby the subject vehicle is prevented from running onto the other vehicle, that is, so-called override of the subject vehicle is prevented, resulting in an increase in the amount of vertical overlap between the rear bumper of the other vehicle and the bumper absorber with the bumper structure of the subject vehicle.

Then, during the period from the middle stage to the later stage of the collision, the rear bumper of the other vehicle is guided by the inclined face of the first absorber portion to move further upward, and then it hits the second absorber portion, which is located on the upper side of the first absorber portion, and is finally received by the second absorber portion.

Next, operations when the other vehicle in the rear collides, from behind, with a large-height vehicle (subject vehicle) having a rear bumper incorporating the bumper structure in which the first absorber portion is arranged on the lower side of the second absorber portion will be described.

In the initial stage of the collision, the front bumper of the other vehicle, which is colliding with the subject vehicle from behind, is guided by the inclined face (recess wall face) of the first absorber portion to move relatively upward while the bumper of the subject vehicle moves relatively downward, resulting in an increase in the amount of vertical overlap between the front bumper of the other vehicle and the bumper absorber with the bumper structure of the subject vehicle.

Then, during the period from the middle stage to the later stage of the collision, the front bumper of the other vehicle is guided by the inclined face of the first absorber portion to move further upward, and then it hits the second absorber portion, which is located on the upper side of the first absorber portion, and is finally received by the second absorber portion.

As such, arranging the first absorber portion on the lower side of the second absorber portion effectively prevents override of a vehicle that is relatively large in height as compared to the collision object.

The above-described bumper structure of the aspect of the invention may be such that the second absorber portion does not protrude toward a vehicle-longitudinal direction inner side beyond the vehicle-longitudinal-direction outer side face of the bumper reinforcement.

Because the second absorber portion protrudes, in the region on the vehicle-longitudinal-direction outer side of the vehicle-longitudinal-direction outer side face of the bumper reinforcement, toward the side opposite to the first absorber portion side beyond the vehicle up-down direction end of the bumper reinforcement on the second absorber portion side, when the second absorber portion receives the bumper of another vehicle that is being guided by the inclined face of the first absorber portion, the second absorber portion rotates such that the protruding portion of the second absorber portion moves toward the rear side of the vehicle, and as a result, the vertical width of the opening of the recess increases, making it easier to receive the bumper of the other vehicle guided by the inclined face of the first absorber portion.

The above-described bumper structure of the aspect of the invention may be such that a portion of the first absorber portion on a side opposite to the second absorber portion side protrudes toward the side opposite to the second absorber portion side beyond a vehicle up-down direction end of the bumper reinforcement on the first absorber portion side, and protrudes toward a vehicle-longitudinal-direction inner side beyond the vehicle-longitudinal-direction outer side face of the bumper reinforcement.

Because the portion of the first absorber portion on the side opposite to the second absorber portion side protrudes toward the side opposite to the second absorber portion side beyond the vehicle up-down direction end of the bumper reinforcement on the first absorber portion side, and protrudes toward the vehicle-longitudinal-direction inner side beyond the vehicle-longitudinal-direction outer side face of the bumper reinforcement, for example, when the inclined face of the first absorber portion is guiding the bumper of other vehicle, the protruding portion of the first absorber portion is supported by the vehicle up-down direction end of the bumper reinforcement, whereby the rotation of the first absorber portion, which causes the protruding portion of the first absorber portion to move toward the vehicle-longitudinal-direction inner side, is suppressed, improving the reliability with which the inclined face of the first absorber portion guides the bumper of the other vehicle.

The above-described bumper structure of the aspect of the invention may be such that a vertical level of a vehicle-longitudinal-direction outer side end of the first absorber portion, as measured from a road surface, is within a vehicle up-down direction range of the bumper reinforcement.

Next, operations of the above-described bumper structure will be described. In the initial stage of the collision, the load applied to the first absorber portion from another vehicle colliding with the subject vehicle is first input, horizontally, to the vehicle-longitudinal-direction outer side end of the first absorber portion. At this time, if the vertical level of the vehicle-longitudinal-direction outer side end of the first absorber portion is higher or lower, in the vehicle up-down direction, than the vehicle up-down direction upper side end or the vehicle up-down direction lower side end of the bumper reinforcement, shear force may be applied to the inside of the bumper absorber in the vehicle longitudinal direction, causing cracking, breakage, or the like of the bumper absorber.

According to the above-described bumper structure, because the vertical level of the vehicle-longitudinal-direction outer side end of the first absorber portion, as measured from the road surface, is within the vehicle up-down direction range of the bumper reinforcement, the load applied, in the initial stage of the collision, from the other vehicle colliding with the subject vehicle, is received within the vehicle up-down direction range of the bumper reinforcement via the vehicle-longitudinal-direction outer side end of the first absorber portion. At this time, the first absorber portion receives, between the bumper of the other vehicle and the bumper reinforcement of the subject vehicle, the load that causes compressive deformation of the first absorber portion, however no shear force is applied to the first absorber portion, and therefore cracking, breakage, and the like of the bumper absorber is prevented.

The above-described bumper structure of the aspect of the invention may be such that the recess is provided only at a vehicle lateral direction center portion of the bumper absorber.

For example, during head-on collision of a vehicle with a flat barrier, a bumper absorber having a recess formed over the entire length of the bumper absorber in the lateral direction of the vehicle decreases in volume more than a bumper absorber having a recess formed only at the vehicle lateral direction center portion of the bumper absorber does, and therefore the impact absorption capacity of the bumper absorber may be insufficient. Therefore, in consideration of a case where the subject vehicle collides head-on with a flat surface, it is preferable that the recess be formed only at the vehicle lateral direction center portion of the bumper absorber, rather than over the entire length of the bumper absorber in the lateral direction of the vehicle, so as to secure a sufficient volume of the bumper absorber.

Typically, the form of a bumper is such that the vehicle lateral direction center portion of the bumper is more convexed toward the vehicle-longitudinal-direction outer side than both ends of the bumper in the vehicle lateral direction are. Therefore, in most cases, the vehicle lateral direction center portion of the bumper is the first to contact the collision object. Thus, if the recess is provided only at the vehicle lateral direction center portion of the bumper absorber, the bumper of the collision object is guided by the inclined face of the vehicle lateral direction center portion of the bumper absorber and then received by the bumper absorber in the initial stage of the collision.

As described above, providing the recess only at the vehicle lateral direction center portion of the bumper absorber effectively prevents underside or override of the subject vehicle while securing a sufficient capacity for absorbing an impact upon head-on collision with a flat barrier.

In the above-described bumper structure of the aspect of the invention, the thickness of the first absorber portion, which is horizontally measured, may be set such that a post-squash thickness, $T1$, of the first absorber portion is equal to or larger than a thickness, $T2$, measured at a bottom of the recess of the bumper absorber ($T1 \geq T2$).

With this configuration, even when the bumper absorber collides with an object, no shear force that may cause cracking, breakage, and the like is not applied to the boundary between the first absorber portion and the bottom. Therefore, even when the first absorber portion has been squashed, cracking, breakage, or the like does not occur between the first absorber portion and the bottom, and thus the impact absorption capacity of the bumper absorber is secured.

The above-described bumper structure of the aspect of the invention may be such that an inclination angle of the recess wall face of the first absorber portion is set within a range of 30 degrees to 60 degrees with respect to the horizontal direction for the purpose of guiding the collision object in the initial stage of a collision.

BRIEF DESCRIPTION OF THE DRAWINGS

The foregoing and further objects, features, and advantages of the invention will become apparent from the following description of embodiments with reference to the accompanying drawings, wherein like numerals are used to represent like elements and wherein.

DETAILED DESCRIPTION OF EMBODIMENTS

First Embodiment

Figure 1:
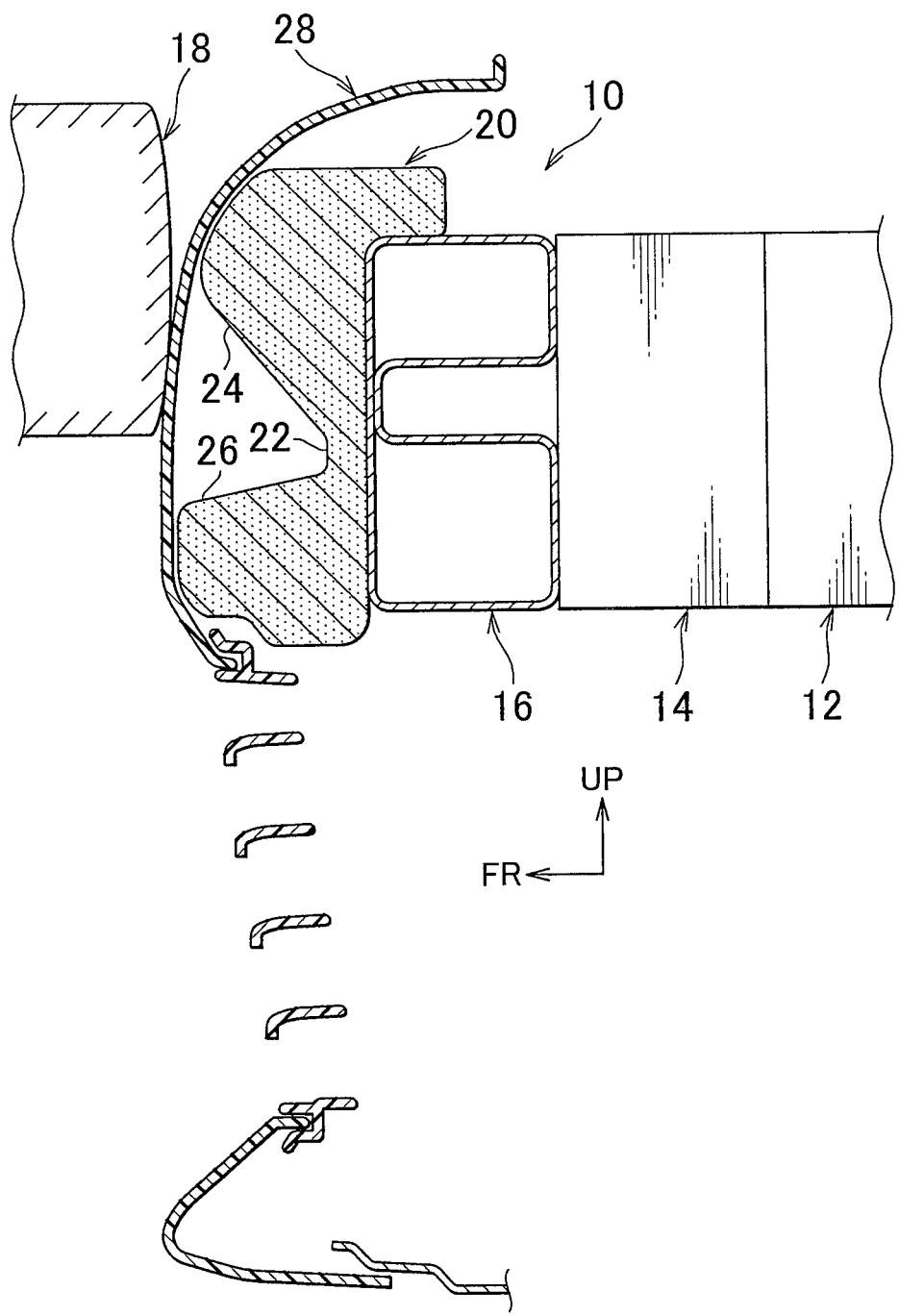
FIG. 1 is a view of a vertical cross section cutting, in the longitudinal direction of the vehicle, through the vehicle lateral direction center of the bumper structure of the first embodiment of the invention.

Hereinafter, a bumper structure according to the first embodiment of the invention will be described with reference to the drawings. The description of the first embodiment will be made on an example, in which the bumper structure of an aspect of the invention is incorporated in the front bumper of a vehicle that is relatively small in height, such as sports cars.

Note that, in the drawings, the arrow "FR" indicates the direction toward the front side of the vehicle, the arrow "UP" indicates the direction toward the upper side of the vehicle, and the arrow "W" indicates the lateral direction of the vehicle.

As shown in FIG. 1, the bumper structure 10 of the first embodiment includes a pair of front side members 12 provided at the respective lateral sides of the vehicle and extending in the longitudinal direction of the vehicle, and a bumper reinforcement 16 extending in the lateral direction of the vehicle is attached on the vehicle front side ends of the respective front side members 12, with a crash boxes 14 interposed between the bumper reinforcement 16 and each of the vehicle front side ends of the crash boxes 14. The crash boxes 14 absorb the impact load transferred from the bumper reinforcement 16 to the front side members 12 by deforming compressively.

Figure 2:
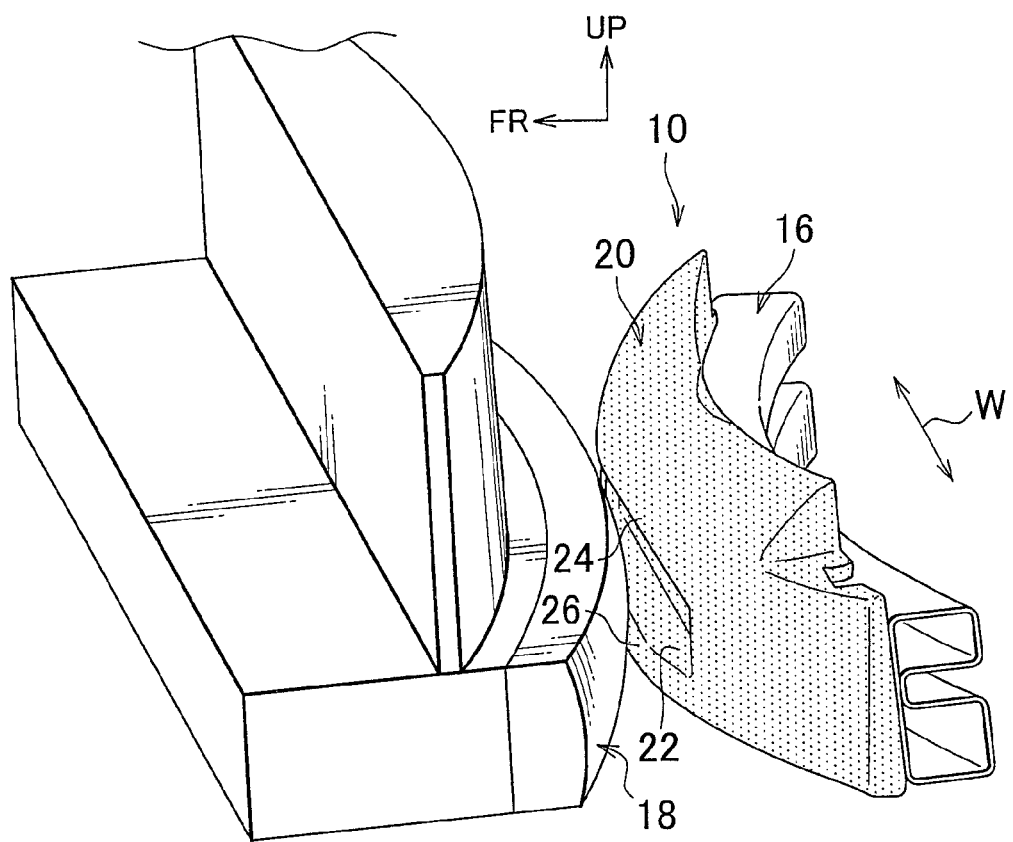
FIG. 2 is a perspective view showing the bumper structure of the first embodiment of the invention and a barrier.

As shown in FIG. 2, the bumper reinforcement 16 in the first embodiment is formed, in the lateral direction of the vehicle, in a generally arc shape such that the vehicle lateral direction center portion is convexed toward the front side of the vehicle.

Figure 3:
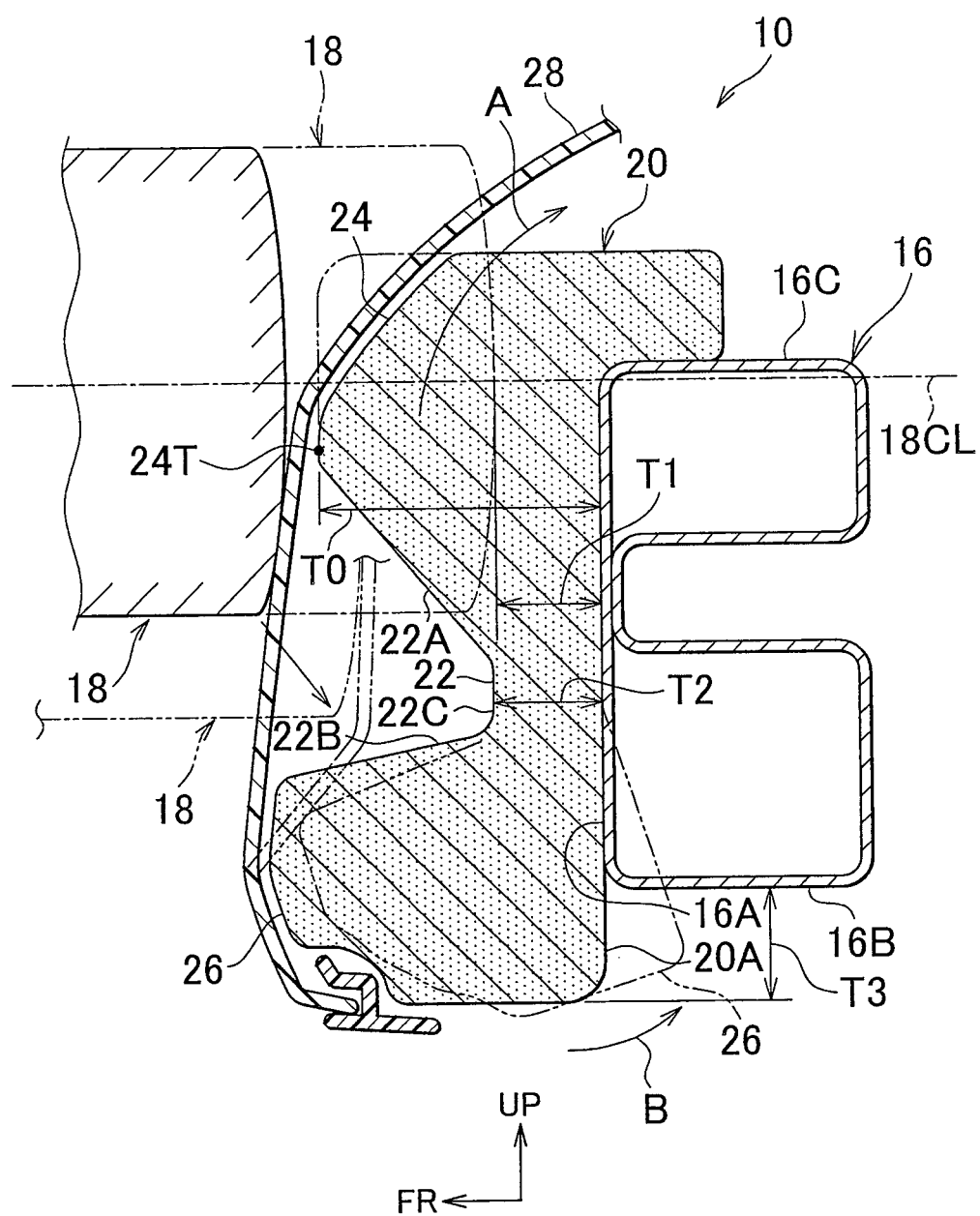
FIG. 3 is a view of a vertical cross section cutting, in the longitudinal direction of the vehicle, through the vehicle lateral direction center of the bumper structure of the first embodiment of the invention.

As shown in FIG. 3, in the first embodiment, a front face 16A of the bumper reinforcement 16, which is the vehicle-longitudinal-direction outer side face of the bumper reinforcement 16, is a vertically extending plane, and a bottom face 16B and top face 16C of the bumper reinforcement 16 are horizontal planes. The vertical level of the top face 16C of the bumper reinforcement 16, as measured from the road surface, is set higher than a vertical center level 18CL of a barrier 18 used in the narrow vertical overlap barrier test of the IIHS.

A bumper absorber 20 is attached on the front face 16A of the bumper reinforcement 16. The bumper absorber 20 is made of, for example, a foamed material, and when impact load is applied to the bumper absorber 20, it deforms (squashes), thereby absorbing the impact load. As well as the bumper reinforcement 16, the bumper absorber 20 is formed in a generally arc shape such that the vehicle lateral direction center portion is convexed toward the front side of the vehicle.

As shown in the cross-sectional view of FIG. 3, the lower portion of the bumper absorber 20 protrudes downward beyond the bottom face 16B of the bumper reinforcement 16 (refer to the length "T3" in FIG. 3). A rear wall face 20A of the bumper absorber 20 extends vertically, and most of the rear wall face 20A is in tight contact with the front face 16A of the bumper reinforcement 16. Although the lower portion of the bumper absorber 20 protrudes downward beyond the bottom face 16B of the bumper reinforcement 16, it does not protrude toward the rear side of the vehicle beyond the front face 16A of the bumper reinforcement 16. On the other hand, the upper portion of the bumper absorber 20 protrudes upward beyond the top face 16C of the bumper reinforcement 16, and a portion of the upper portion of the bumper absorber 20 extends toward the rear side of the vehicle so as to extend onto the upper side of the top face 16C of the bumper reinforcement 16.

Figure 4:
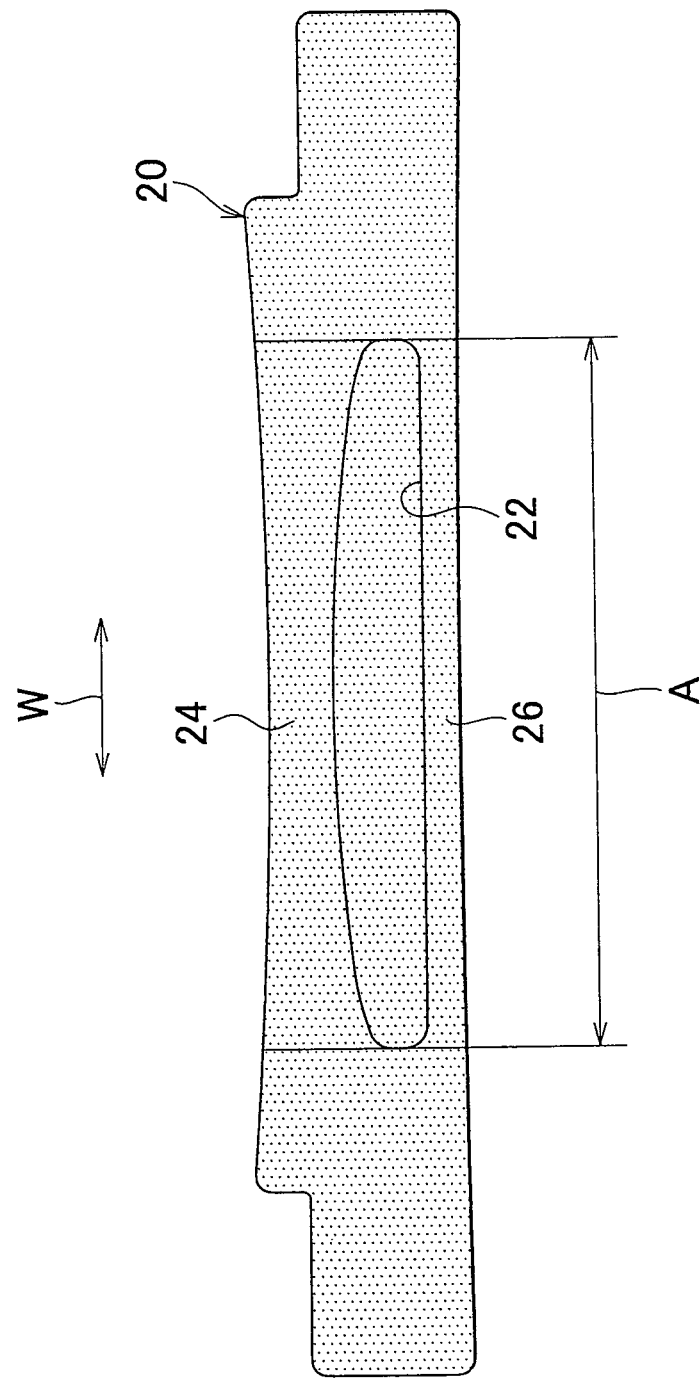
FIG. 4 is a front view of a bumper absorber.

As shown in FIGS. 2 and 4, a recess 22 is formed only at the vehicle lateral direction center portion of the bumper absorber 20 such that it extends in the lateral direction of the vehicle. As shown in FIG. 3, the recess 22 is formed at a vertical level that is lower than the top face 16C of the bumper reinforcement 16 but higher than the bottom face 16B of the bumper reinforcement 16. As shown in FIGS. 3 and 4, the portion of the bumper absorber 20 on the upper side of the recess 22 within a vehicle lateral direction region A (see FIG. 4) over which the recess 22 of the bumper absorber 20 is formed and the portion of the bumper absorber 20 on the lower side of the recess 22 within the vehicle lateral direction region A will hereinafter be referred to as "upper absorber portion 24" and "lower absorber portion 26", respectively. In the first embodiment, the upper absorber portion 24 serves as "first absorber portion" in the invention, and the lower absorber portion 26 serves as "second absorber portion" in the invention.

Next, the upper absorber portion 24 will be described in detail. As shown in the cross-sectional view of FIG. 3, the upper absorber portion 24 is mountain-shaped toward the front side of the vehicle, and an upper recess wall face 22A of the upper absorber portion 24, which faces the lower absorber portion 26, is inclined such that the portion of the upper recess wall face 22A on the side closer to a bottom 22C of the recess 22 (the rear side of the vehicle) is closer to the lower absorber portion 26 than the portion of the upper recess wall face 22A on the side closer to the opening of the recess 22 (the front side of the vehicle) is. That is, the upper recess wall face 22A is inclined obliquely downward with respect to the horizontal direction such that the vehicle rear side portion of the upper recess wall face 22A is located lower than the vehicle front side portion of the upper recess wall face 22A. As shown in FIG. 3, in the first embodiment, the upper recess wall face 22A lineally extends from a vehicle front side apex 24T of the upper absorber portion 24 toward the bottom 22C of the recess 22, as viewed in the cross section of the bumper absorber 20. However, it should be noted that the upper recess wall face 22A may curve.

In the first embodiment, at least a portion of the upper absorber portion 24 of the bumper absorber 20 is located at a vertical level higher than the vertical center level 18CL of the barrier 18 used in the narrow vertical overlap barrier test of the IIHS. Further, in the first embodiment, the vertical level of the vehicle front side apex 24T of the upper absorber portion 24 of the bumper absorber 20, as measured from the road surface, is lower than the top face 16C of the bumper reinforcement 16 and is lower than the vertical center level 18CL of the barrier 18 used in the narrow vertical overlap barrier test of the IIHS.

As shown in FIG. 3, in the first embodiment, the vehicle front side face of the portion of the upper absorber portion 24 which is present on the upper side of the vehicle front side apex 24T is obliquely inclined so as to face obliquely upward toward the front side of the vehicle in consideration of the exterior design. However, it may be a vertical face as indicated by a chain double-dashed line in FIG. 3.

The thickness T0 (before collision) of the upper absorber portion 24, which is horizontally measured from the rear wall face 20A of the upper absorber portion 24, is set such that the post-squash thickness T1 of the upper absorber portion 24, which represents the thickness of the upper absorber portion 24 when it has been squashed to the maximum extent possible due to collision with the barrier 18 used in the narrow vertical overlap barrier test of the IIHS, is equal to or larger than the thickness T2 (before collision) measured at the bottom 22C of the recess 22 of the bumper absorber 20 (T1≥T2). For example, the thickness T0 of the upper absorber portion 24 is determined through actual tests. In the first embodiment, the thickness T0 of the upper absorber portion 24 is 60 mm, and the thickness T2 measured at the bottom 22C of the recess 22 of the bumper absorber 20 is 20 mm. It should be noted that these values of the thicknesses T0 and T2 in the first embodiment are no more than examples and they may be changed as needed based on the material, shape, etc. of the bumper absorber 20.

Next, the lower absorber portion 26 will be described in detail. A lower recess wall face 22B of the lower absorber portion 26, which faces the upper absorber portion 24, is inclined such that the portion of the lower recess wall face 22B on the side closer to the bottom 22C of the recess 22 (the rear side of the vehicle) is closer to the upper absorber portion 24 than the portion of the lower recess wall face 22B on the side closer to the opening of the recess 22 (the front side of the vehicle) is. That is, the lower recess wall face 22B is inclined with respect to the horizontal direction such that the vehicle rear side portion of the lower recess wall face 22B is located higher than the vehicle front side portion of the lower recess wall face 22B. Note that the inclination angle of the lower recess wall face 22B with respect to the horizontal direction is set smaller than that of the upper recess wall face 22A in the first embodiment.

A thin bumper cover 28 made of a synthetic resin is provided on the vehicle front side of the bumper absorber 20 with a gap provided therebetween.

Next, operations of the bumper structure 10 of the first embodiment will be described. First, full vertical overlap frontal collision will be described. During full vertical overlap frontal collision of a vehicle having a front bumper incorporating the bumper structure 10 of the first embodiment with a barrier, or the like, the whole part of the bumper absorber 20 compressively deforms in the longitudinal direction of the vehicle, thereby absorbing the collision load efficiently.

The bumper absorber 20 has the recess 22 as mentioned above. However, because the recess 22 is formed only at the vehicle lateral direction center portion of the bumper absorber 20, that is, it is not formed over the entire length of the bumper absorber 20 in the lateral direction of the vehicle, the volume of the bumper absorber 20 is large enough to sufficiently absorb the collision load during full vertical overlap frontal collision.

In a case where the bumper structure 10 of the first embodiment is incorporated in the front bumper of a vehicle that is relatively small in height, such as sports cars, the vertical level of the front bumper of the vehicle (subject vehicle), which incorporates the bumper structure 10 of the first embodiment, is relatively low as compared to the vertical level of the rear bumper of other vehicle in front (corresponding to the barrier used in the narrow vertical overlap barrier test of the IIHS), with which the subject vehicle collides.

As shown in FIG. 3, for example, in a case where the front bumper of the subject vehicle collides with the barrier 18 used in the collision test of the IIHS, because the subject vehicle is relatively small in height, the amount of vertical overlap between the bumper absorber 20 and the barrier 18 is small.

However, when a bumper of the subject vehicle incorporates the bumper structure 10 of the first embodiment, in the initial stage of the collision, the barrier 18 moves obliquely downward (refer to the barrier 18 indicated by a chain double-dashed line in FIG. 3) by being guided by the upper recess wall face 22A, which is an inclined face of the upper absorber portion 24, whereby underride of the subject vehicle is prevented, and thus the amount of vertical overlap between the barrier 18 and the bumper absorber 20 of the bumper structure 10 of the subject vehicle and the amount of vertical overlap between the barrier 18 and the bumper reinforcement 16 of the bumper structure 10 of the subject vehicle increase. As such, the bumper absorber 20 reliably receives the impact load from the barrier 18.

It is sufficient to set the inclination angle of the upper recess wall face 22A with respect to the horizontal direction such that, in the initial stage of the collision, the barrier 18 colliding with the subject vehicle is guided downward by the upper recess wall face 22A. In the first embodiment, the inclination angle of the upper recess wall face 22A with respect to the horizontal direction is approximately 45 degrees. However, for example, the inclination angle of the upper recess wall face 22A may be set to another angle within the range of 30 to 60 degrees. It should be noted that the inclination angle of the upper recess wall face 22A is not limited to any of these angles. As described above, the recess 22 is provided at the vehicle lateral direction center portion of the bumper absorber 20 that is formed in an arc shape in the lateral direction of vehicle. Therefore, the recess 22 can reliably guide the barrier 18 into the recess 22 itself in the initial stage of the collision.

When the upper recess wall face 22A of the upper absorber portion 24 is guiding the barrier 18 to move obliquely downward toward the rear side of the vehicle, the barrier 18 pushes the upper absorber portion 24, urging it to rotate in the direction indicated by the arrow A in FIG. 3. According to the bumper structure 10 of the first embodiment, however, because the upper portion (upper end portion) of the upper absorber portion 24 protrudes toward the upper side of the vehicle beyond the top face 16C of the bumper reinforcement 16, and further the upper portion protrudes toward the vehicle-longitudinal-direction inner side (the direction opposite to the direction indicated by the arrow FR in FIG. 3) beyond the front face 16A of the bumper reinforcement 16 so as to extend onto the top face 16C of the bumper reinforcement 16, the rotation of the upper absorber portion 24 in the direction indicated by the arrow k in FIG. 3 is suppressed by the upper portion of the upper absorber portion 24 contacting the top face 16C of the bumper reinforcement 16. Thus, during the collision, the direction of the upper recess wall face 22A, which is guiding the barrier 18, does not largely change, and therefore the barrier 18 is reliably guided toward the lower absorber portion 26.

On the other hand, if the bumper absorber 20 did not have the recess 22 of the first embodiment, the barrier 18 would not move downward and thus would hit the portion of the bumper absorber above the top face 16C of the bumper reinforcement 16, forcing the bumper reinforcement 16 to rotate (in such a direction that the top face 16C of the bumper reinforcement 16 is directed to the rear side of the vehicle), as viewed from a side of the vehicle, and then the barrier 18 would move to the upper side of the bumper reinforcement 16.

According to the bumper absorber 20 in the first embodiment, further, the load applied from the barrier 18 is first input, horizontally, to the vehicle front side apex 24T of the upper absorber portion 24. Because the vertical level of the vehicle front side apex 24T, as measured from the road surface, is within the vehicle up-down direction range of the bumper reinforcement 16 that receives the load from the bumper absorber 20, the load applied from the barrier 18 in the initial stage of the collision is horizontally transferred to the bumper reinforcement 16 via the vehicle front side apex 24T. At this time, the upper absorber portion 24 of the bumper absorber 20 receives, between the barrier 18 and the bumper reinforcement 16, the load that causes compressive deformation of the upper absorber portion 24 but receives no shear force, and therefore cracking, breakage, or the like of the bumper absorber 20, which may otherwise be caused by shear force, does not occur.

Then, during the period from the middle stage to the later stage of the collision, the barrier 18, which is colliding with the subject vehicle, is guided by the upper recess wall face 22A of the upper absorber portion 24 to move further downward, and then the barrier 18 hits the lower absorber portion 26 located on the lower side of the upper absorber portion 24, and the barrier 18 is finally received by the lower absorber portion 26.

Because the lower portion of the lower absorber portion 26 that receives the barrier 18 does not protrude toward the rear side of the vehicle beyond the front face 16A of the bumper reinforcement 16, the lower absorber portion 26, as indicated by a chain double-dashed line in FIG. 3, deforms rotationally in the direction indicated by the arrow B in FIG. 3, increasing the vertical width of the opening of the recess 22 and thus making it easier to receive the barrier 18 guided by the upper recess wall face 22A of the upper absorber portion 24.

In addition, as a result of the collision between the bumper absorber 20 and the barrier 18, the upper absorber portion 24 is compressed and thus squashed. However, because the post-squash thickness T1 of the upper absorber portion 24, which is the thickness of the upper absorber portion 24 when it has been squashed to the maximum extent possible, is equal to or larger than the thickness T2 at the bottom 22C that is adjacent to the upper absorber portion 24 of the bumper absorber 20, no shear force that may cause cracking, breakage, and the like is not applied to the boundary between the upper absorber portion 24 and the bottom 22C. Therefore, even when the upper absorber portion 24 has been squashed, cracking, breakage, or the like does not occur between the upper absorber portion 24 and the bottom 22C, and thus the impact absorption capacity of the bumper absorber 20 is secured. It should be noted that the impact absorption capacity of the bumper absorber 20 may decrease if cracking, breakage, or the like occurs at the bumper absorber 20.

The collision load applied from the barrier 18 is transferred to the bumper cover 28, to the bumper absorber 20, to the bumper reinforcement 16, to the crash boxes 14, and finally to the front side members 12. After the compressive deformation of the bumper absorber 20, the collision load is effectively absorbed by bending of the bumper reinforcement 16, compressive deformation of the crash boxes 14, and so on.

Second Embodiment

Next, a bumper structure according to the second embodiment of the invention will be described with reference to FIG. 5. Note that the elements identical to those in the first embodiment are denoted by the same numerals, and the descriptions on them will be omitted. The second embodiment is an example, in which the bumper structure of an aspect of the invention is incorporated in the rear bumper of a vehicle that is relatively small in height, such as supports cars.

Figure 5:
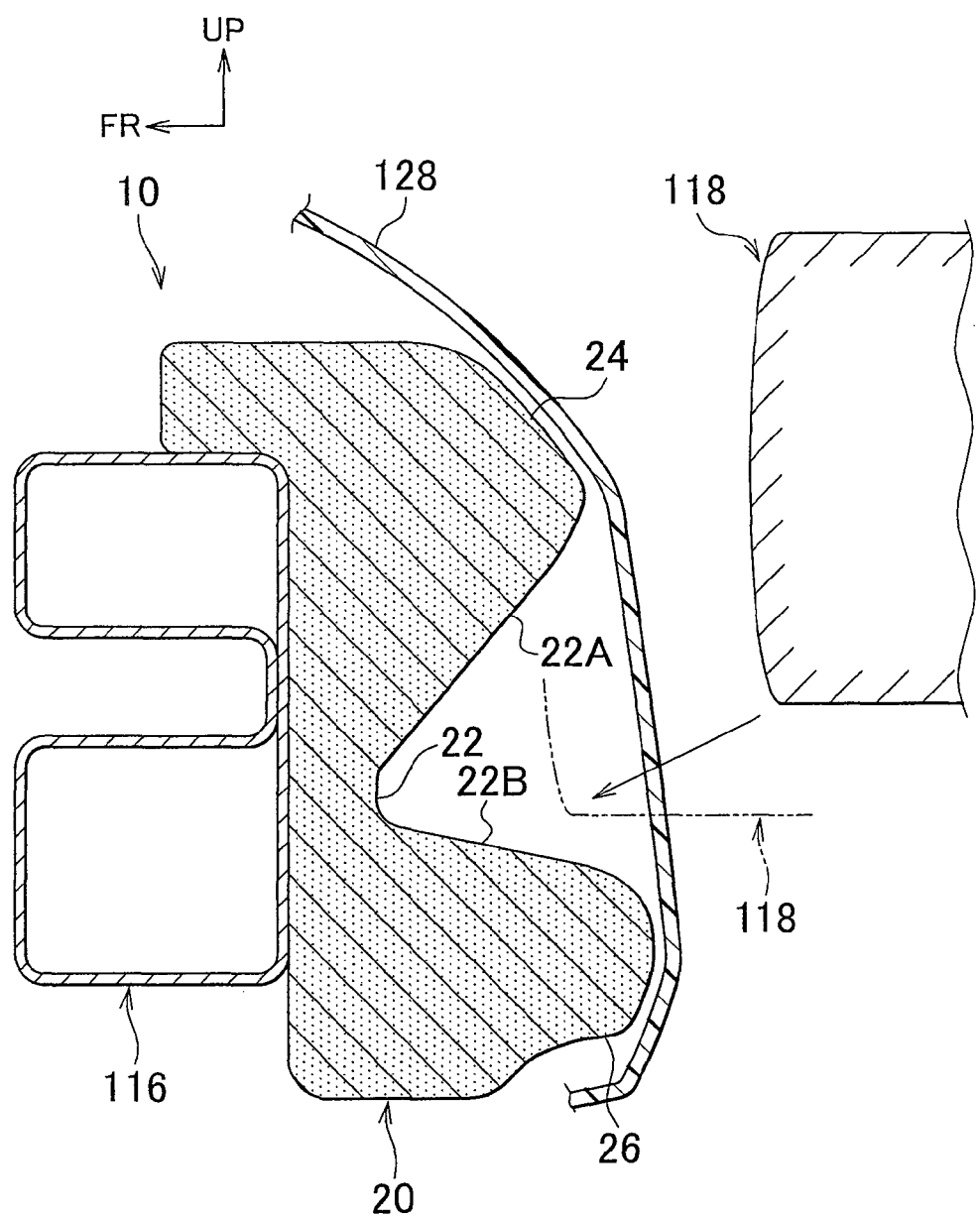
FIG. 5 is a view of a vertical cross section cutting through the vehicle lateral direction center of the bumper structure of the second embodiment of the invention.

As shown in FIG. 5, in the bumper structure 10 of the second embodiment, the reference numeral 128 indicates a rear bumper cover and the reference numeral 116 indicates a rear bumper reinforcement, and the bumper absorber 20 is attached on the vehicle rear side face of the bumper reinforcement 116.

The bumper structure 10 of the second embodiment, which is applied to a rear bumper, is substantially the same as the bumper structure 10 of the first embodiment, which is applied to a front bumper. The shape of the bumper structure 10 of the first embodiment and that of the bumper structure 10 of the second embodiment are in an axisymmetric relation with respect to the symmetry axis of the vertically extending centerline in the longitudinal direction of the vehicle.

Next, operations when another vehicle in the rear collides, from behind, with a vehicle (subject vehicle) incorporating the bumper structure 10 of the second embodiment will be described. The shape of the bumper absorber 20 in the second embodiment is the same as that of the bumper absorber 20 in the first embodiment, and the vertical positional relation between the bumper absorber 20 in the second embodiment and a front bumper 118 of the other vehicle (corresponding to the barrier 18 in the first embodiment) that collides with the subject vehicle is the same as the corresponding vertical positional relation of the first embodiment.

In the initial stage of the collision, the front bumper 118 of the other vehicle colliding with the subject vehicle is guided by the upper recess wall face 22A of the upper absorber portion 24 to move relatively downward (refer to the front bumper 118 indicated by a chain double-dashed line in FIG. 5), increasing the amount of vertical overlap between the front bumper 118 of the other vehicle colliding with the subject vehicle and the bumper absorber 20 of the bumper structure 10 of the subject vehicle. Other operations and effects of the bumper structure 10 of the second embodiment are the same as those of the bumper structure 10 of the first embodiment, and therefore the descriptions on them will be omitted.

Third Embodiment

Next, a bumper structure according to the third embodiment of the invention will be described with reference to FIG. 6. Note that the elements identical to those in the first embodiment are denoted by the same numerals, and the descriptions on them will be omitted. The third embodiment is an example, in which the bumper structure of an aspect of the invention is incorporated in the front bumper of a vehicle that is relatively large in height, such as RVs.

Figure 6:
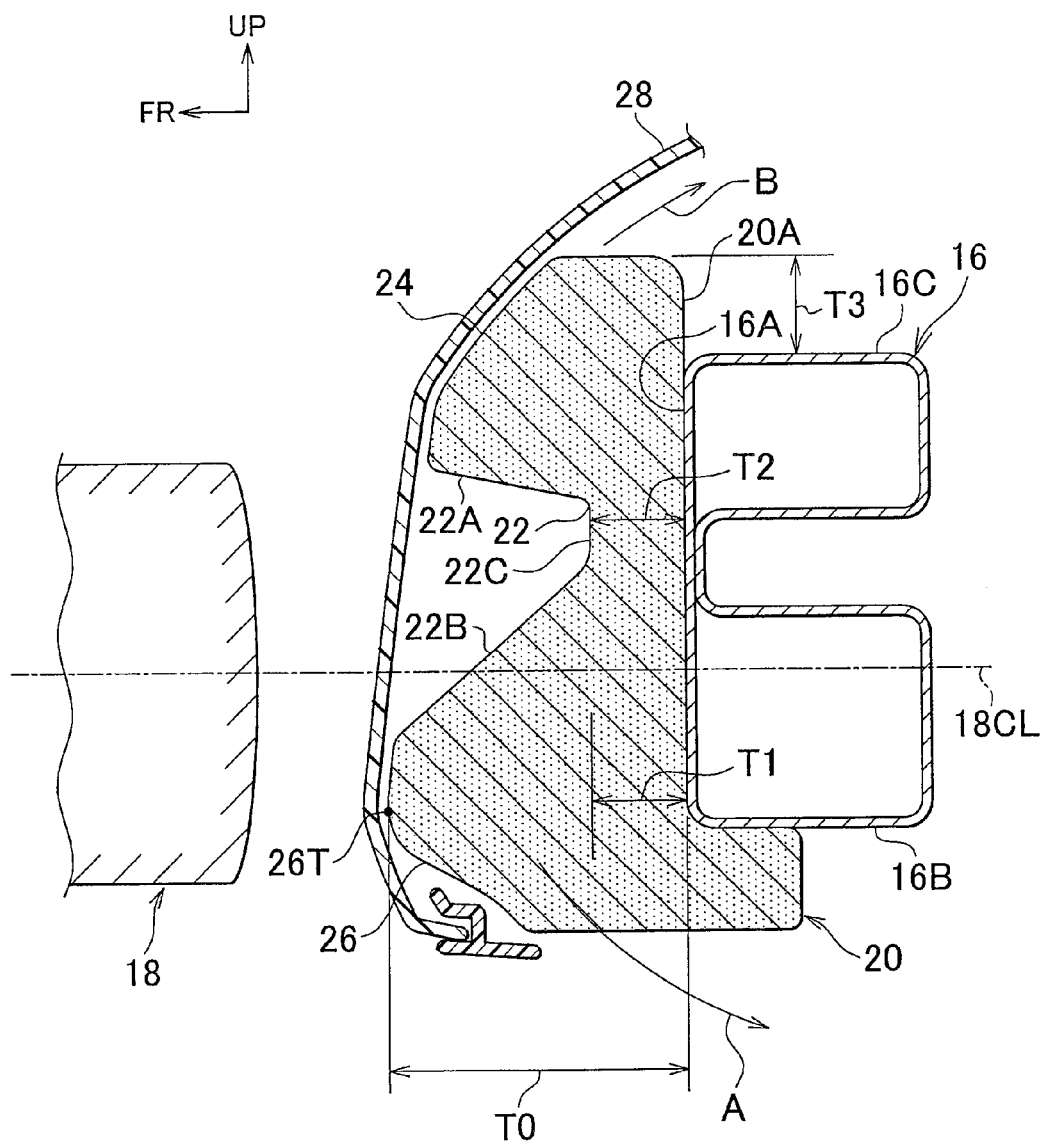
FIG. 6 is a view of a vertical cross section cutting through the vehicle lateral direction center of the bumper structure of the third embodiment of the invention.

As shown in FIG. 6, the vertical level of the top face 16C of the bumper reinforcement 16 in the third embodiment, as measured from the road surface, is set higher than that of the top face 16C of the bumper reinforcement 16 in the first embodiment, with respect to the vertical center level 18CL of the barrier 18. The upper portion of the bumper absorber 20 protrudes upward beyond the top face 16C of the bumper reinforcement 16 (refer to the length "T3" in FIG. 6), but it does not protrude toward the rear side of the vehicle beyond the front face 16A of the bumper reinforcement 16.

On the other hand, the lower portion of the bumper absorber 20 protrudes downward beyond the bottom face 16B of the bumper reinforcement 16, and a portion of the lower portion of the bumper absorber 20 extends toward the rear side of the vehicle so as to extend onto the lower side of the bottom face 16B of the bumper reinforcement 16.

Next, the lower absorber portion 26 will be described in detail. In the third embodiment, the lower absorber portion 26 serves as "first absorber portion" in the invention. The lower absorber portion 26 is mountain-shaped toward the front side of the vehicle, and the lower recess wall face 22B of the lower absorber portion 26, which faces the upper absorber portion 24, is inclined such that the portion of the lower recess wall face 22B on the side closer to the bottom 22C of the recess 22 (the rear side of the vehicle) is closer to the upper absorber portion 24 than the portion of the lower recess wall face 22B on the side closer to the opening of the recess 22 (the front side of the vehicle) is. That is, the lower recess wall face 22B is inclined obliquely upward with respect to the horizontal direction such that the vehicle rear side portion of the lower recess wall face 22B is located higher than the vehicle front side portion of the lower recess wall face 22B. In the third embodiment, the inclination angle of the lower recess wall face 22B with respect to the horizontal direction is approximately 45 degrees. However, for example, the inclination angle of the lower recess wall face 22B may be set to another angle within the range of 30 to 60 degrees. It should be noted that the inclination angle of the lower recess wall face 22B is not limited to any of these angles.

In the third embodiment, at least a portion of the lower absorber portion 26 of the bumper absorber 20 is located at a vertical level lower than the vertical center level 18CL of the barrier 18 used in the narrow vertical overlap barrier test of the IIHS. Further, in the third embodiment, the vertical level of a vehicle front side apex 26T of the lower absorber portion 26, as measured from the road surface, is higher than the bottom face 16B of the bumper reinforcement 16 but is lower than the vertical center level 18CL of the barrier 18 used in the narrow vertical overlap barrier test of the IIHS.

The thickness T0 of the lower absorber portion 26, which is horizontally measured from the rear wall face 20A, is set such that the post-squash thickness T1 of the lower absorber portion 26, which represents the thickness of the lower absorber portion 26 when it has been squashed to the maximum extent possible due to collision with the barrier 18 used by the IIHS, is equal to or larger than the thickness T2 measured at the bottom 22C of the recess 22 of the bumper absorber 20 (T1≥T2).

Next, the upper absorber portion 24 will be described in detail. In the third embodiment, the upper absorber portion 24 serves as "second absorber portion" in the invention. The upper recess wall face 22A of the upper absorber portion 24, which faces the lower absorber portion 26, is inclined such that the portion of the upper recess wall face 22A on the side closer to the bottom 22C of the recess 22 (the rear side of the vehicle) is closer to the lower absorber portion 26 than the portion of the upper recess wall face 22A on the side closer to the opening of the recess 22 (the front side of the vehicle) is. That is, the upper recess wall face 22A is inclined obliquely downward with respect to the horizontal direction such that the vehicle rear side portion of the upper recess wall face 22A is located lower than the vehicle front side portion of the upper recess wall face 22A.

Next, operations of the bumper structure 10 of the third embodiment will be described. In a case where the bumper structure 10 of the third embodiment is incorporated in the front bumper of a vehicle that is relatively large in height, such as RVs, the vertical level of the front bumper of the vehicle (subject vehicle), which incorporates the bumper structure 10 of the third embodiment, is relatively high as compared to the vertical level of the object that collides with the subject vehicle (e.g., the rear bumper of another vehicle in front, and the barrier used in the narrow vertical overlap barrier test of the IIHS).

For example, in a case where the front bumper of the subject vehicle collides with the barrier 18 used in the collision test of the IIHS, because the subject vehicle is relatively large in height, the amount of vertical overlap between the bumper absorber 20 and the barrier 18 is small. However, when the front bumper of the subject vehicle incorporates the bumper structure 10 of the third embodiment, in the initial stage of the collision, the barrier 18 is guided by the lower recess wall face 22B of the lower absorber portion 26 to move relatively upward, whereby override of the subject vehicle is prevented, and thus the amount of vertical overlap between the barrier 18 and the bumper absorber 20 of the bumper structure 10 of the subject vehicle increases.

When the lower recess wall face 22B of the lower absorber portion 26 is guiding the barrier 18 to move obliquely upward toward the rear side of the vehicle, the barrier 18 pushes the lower absorber portion 26, urging it to rotate in the direction indicated by the arrow A in FIG. 6. According to the bumper structure 10 of the third embodiment, however, because the lower portion of the lower absorber portion 26 protrudes toward the lower side of the vehicle beyond the bottom face 16B of the bumper reinforcement 16, and further the lower portion protrudes toward the vehicle longitudinal direction inner side (the direction opposite to the direction indicated by the arrow FR in FIG. 6) beyond the front face 16A of the bumper reinforcement 16 so as to extend onto the lower side of the bottom face 16B of the bumper reinforcement 16, the rotation of the lower absorber portion 26 in the direction indicated by the arrow A in FIG. 6 is suppressed by the lower portion of the lower absorber portion 26 contacting the bottom face 16B of the bumper reinforcement 16. Thus, during the collision, the direction of the lower recess wall face 22B, which is guiding the barrier 18, does not largely change, and therefore the barrier 18 is reliably guided toward the upper absorber portion 24.

According to the bumper absorber 20 in the third embodiment, further, the load applied from the barrier 18 is first input, horizontally, to the vehicle front side apex 26T of the lower absorber portion 26. Because the vertical level of the vehicle front side apex 26T, as measured from the road surface, is within the vehicle up-down direction range of the bumper reinforcement 16 that receives the load from the bumper absorber 20, the load applied from the barrier 18 in the initial stage of the collision is horizontally transferred to the bumper reinforcement 16 via the vehicle front side apex 26T. At this time, the lower absorber portion 26 of the bumper absorber 20 receives, between the barrier 18 and the bumper reinforcement 16, the load that causes compressive deformation of the lower absorber portion 26 but receives no shear force, and therefore cracking, breakage, or the like of the bumper absorber 20, which may otherwise be caused by shear force, does not occur.

Then, during the period from the middle stage to the later stage of the collision, the barrier 18 is guided by the lower recess wall face 22B of the lower absorber portion 26 to move further upward, and then the barrier 18 hits the upper absorber portion 24 located above the lower absorber portion 26, and the barrier 18 is finally received by the upper absorber portion 24.

Because the upper portion of the upper absorber portion 24 that receives the barrier 18 does not protrude toward the rear side of the vehicle beyond the front face 16A of the bumper reinforcement 16, the upper absorber portion 24 deforms so as to rotate in the direction indicated by the arrow B in FIG. 6, increasing the vertical width of the opening of the recess 22 and thus making it easier to receive the barrier 18 guided by the lower recess wall face 22B of the lower absorber portion 26.

In addition, as a result of the collision between the bumper absorber 20 and the barrier 18, the lower absorber portion 26 is compressed and thus squashed. However, because the post-squash thickness T1 of the lower absorber portion 26, which is the thickness of the lower absorber portion 26 when it has been squashed to the maximum extent possible, is equal to or larger than the thickness T2 at the bottom 22C that is adjacent to the lower absorber portion 26 of the bumper absorber 20, no shear force that may cause cracking, breakage, and the like at the boundary between the lower absorber portion 26 and the bottom 22C is applied. Therefore, even when the lower absorber portion 26 has been squashed, cracking, breakage, or the like does not occur between the lower absorber portion 26 and the bottom 22C, and thus the impact absorption capacity of the bumper absorber 20 is secured.

Fourth Embodiment

Figure 7:
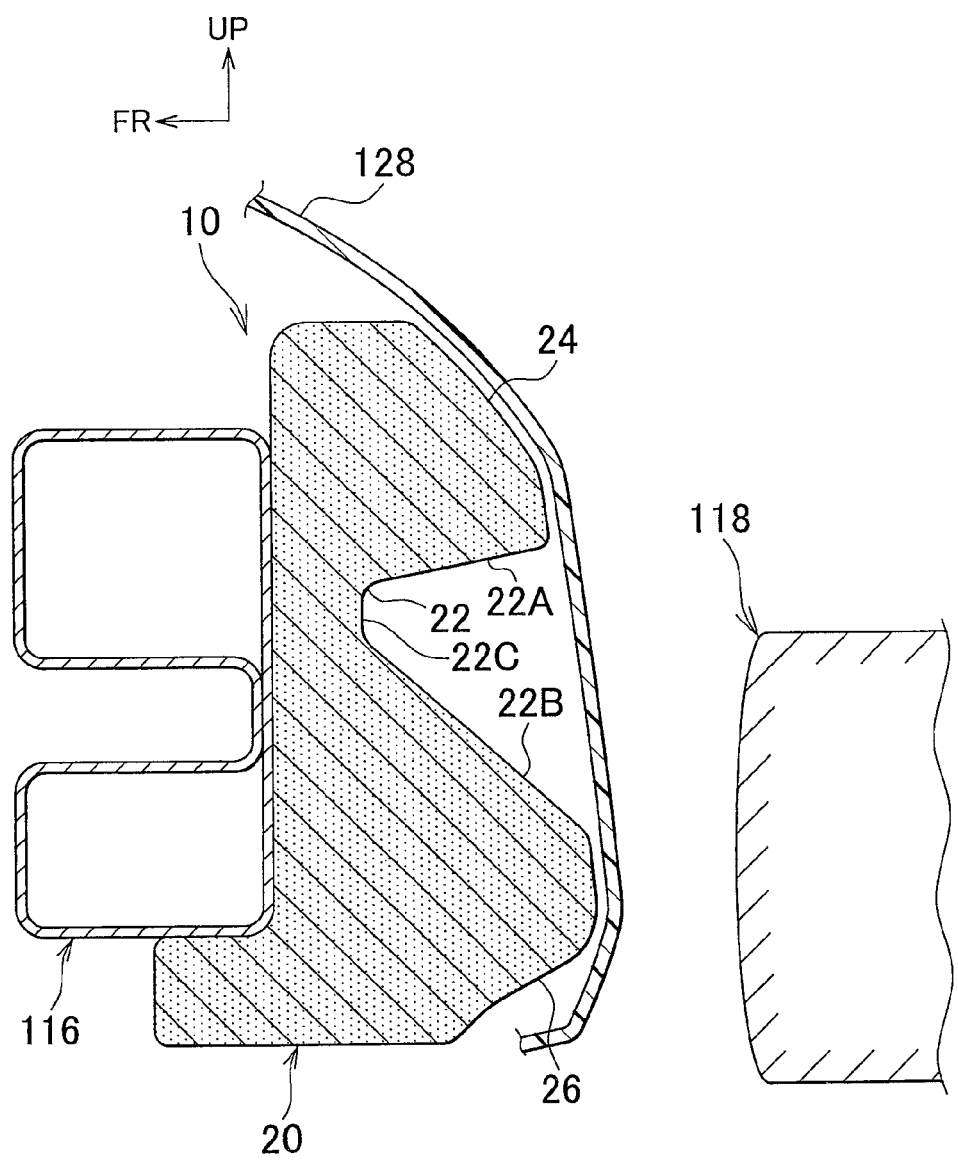
FIG. 7 is a view of a vertical cross section cutting through the vehicle lateral direction center of the bumper structure of the fourth embodiment of the invention.

Next, a bumper structure according to the fourth embodiment of the invention will be described with reference to FIG. 7. Note that the elements identical to those in the forgoing embodiments are denoted by the same numerals, and the descriptions on them will be omitted. The fourth embodiment is an example, in which the bumper structure of an aspect of the invention is incorporated in the rear bumper of a vehicle that is relatively large in height, such as RVs.

The bumper structure 10 of the fourth embodiment, which is applied to a rear bumper, is substantially the same as the bumper structure 10 of the third embodiment, which is applied to a front bumper. The shape of the bumper structure 10 of the fourth embodiment and that of the bumper structure 10 of the third embodiment are in an axisymmetric relation with respect to the symmetric axis of the vertically extending centerline in the longitudinal direction of the vehicle.

Next, operations when another vehicle in the rear collides, from behind, with a vehicle (subject vehicle) incorporating the bumper structure 10 of the fourth embodiment will be described. The shape of the bumper absorber 20 in the fourth embodiment is the same as that of the bumper absorber 20 in the third embodiment, and the vertical positional relation between the bumper absorber 20 in the fourth embodiment and the front bumper 118 of the other vehicle (or the barrier 18) that collides with the subject vehicle is the same as the corresponding vertical positional relation of the third embodiment.

In the initial stage of the collision, the front bumper 118 of the other vehicle colliding with the subject vehicle is guided by the lower recess wall face 22B of the lower absorber portion 26 to move relatively upward, increasing the amount of vertical overlap between the front bumper 118 of the other vehicle colliding with the subject vehicle and the bumper absorber 20 of the bumper structure 10 of the subject vehicle. Other operations and effects of the bumper structure 10 of the fourth embodiment are the same as those of the bumper structure 10 of the third embodiment, and therefore the descriptions on them will be omitted. According to any of the bumper structures 10 of the above-described embodiments of the invention, underside or override is effectively prevented by simply providing the optimized recess 22, and therefore the number of required parts is minimized.

The invention has been described with reference to the embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A bumper structure, comprising:
a bumper reinforcement; and
a bumper absorber that is provided on a vehicle-longitudinal-direction outer side of the bumper reinforcement, the bumper absorber including:
a first absorber portion that is provided on one vertical side of a recess that is formed at a vertically intermediate portion of the bumper absorber and the recess faces a vehicle-longitudinal-direction outer side; and
a second absorber portion that is provided on the other vertical side of the recess,
wherein a recess wall face of the first absorber portion that faces the second absorber portion is inclined such that a portion of the recess wall face, on a side closer to a bottom of the recess, is closer to the second absorber portion than a portion of the recess wall face on a side closer to an opening of the recess is, wherein an inclination angle of the recess wall face of the first absorber portion is set within a range of 30 degrees to 60 degrees with respect to a horizontal direction,
wherein the second absorber portion protrudes, in a region on a vehicle-longitudinal-direction outer side of a vehicle-longitudinal-direction outer side face of the bumper reinforcement, toward a side opposite to the first absorber portion side beyond a vehicle up-down direction end of the bumper reinforcement on a second absorber portion side, and wherein the second absorber portion does not protrude toward a vehicle-longitudinal-direction inner side beyond the vehicle-longitudinal-direction outer face of the bumper reinforcement,
wherein a portion of the first absorber portion on a side opposite to the second absorber portion side protrudes towards the side opposite to the second absorber portion side, beyond a vehicle up-down direction end of the bumper reinforcement on the first absorber portion side, and protrudes towards the vehicle-longitudinal-direction inner side beyond the vehicle-longitudinal-direction outer side face of the bumper reinforcement.

2. The bumper structure according to claim 1, wherein the first absorber portion is arranged on an upper side of the second absorber portion.

3. The bumper structure according to claim 1, wherein the first absorber portion is arranged on a lower side of the second absorber portion.

4. The bumper structure according to claim 1, wherein a vertical level of a vehicle-longitudinal-direction outer side end of the first absorber portion, as measured from a road surface, is within the vehicle up-down direction range of the bumper reinforcement.

5. The bumper structure according to claim 1, wherein the recess is provided only at a vehicle lateral direction center portion of the bumper absorber.

6. The bumper structure according to claim 1, wherein a thickness of the first absorber portion, which is horizontally measured, is set such that a post-squash thickness T1, of the first absorber portion is equal to or larger than a thickness T2, measured at a bottom of the recess of the bumper absorber (T1≥T2).

* * * * *